July 4, 1950
J. T. ROBSON
2,514,143
SALT GLAZING APPARATUS
Filed May 4, 1946
2 Sheets-Sheet 1
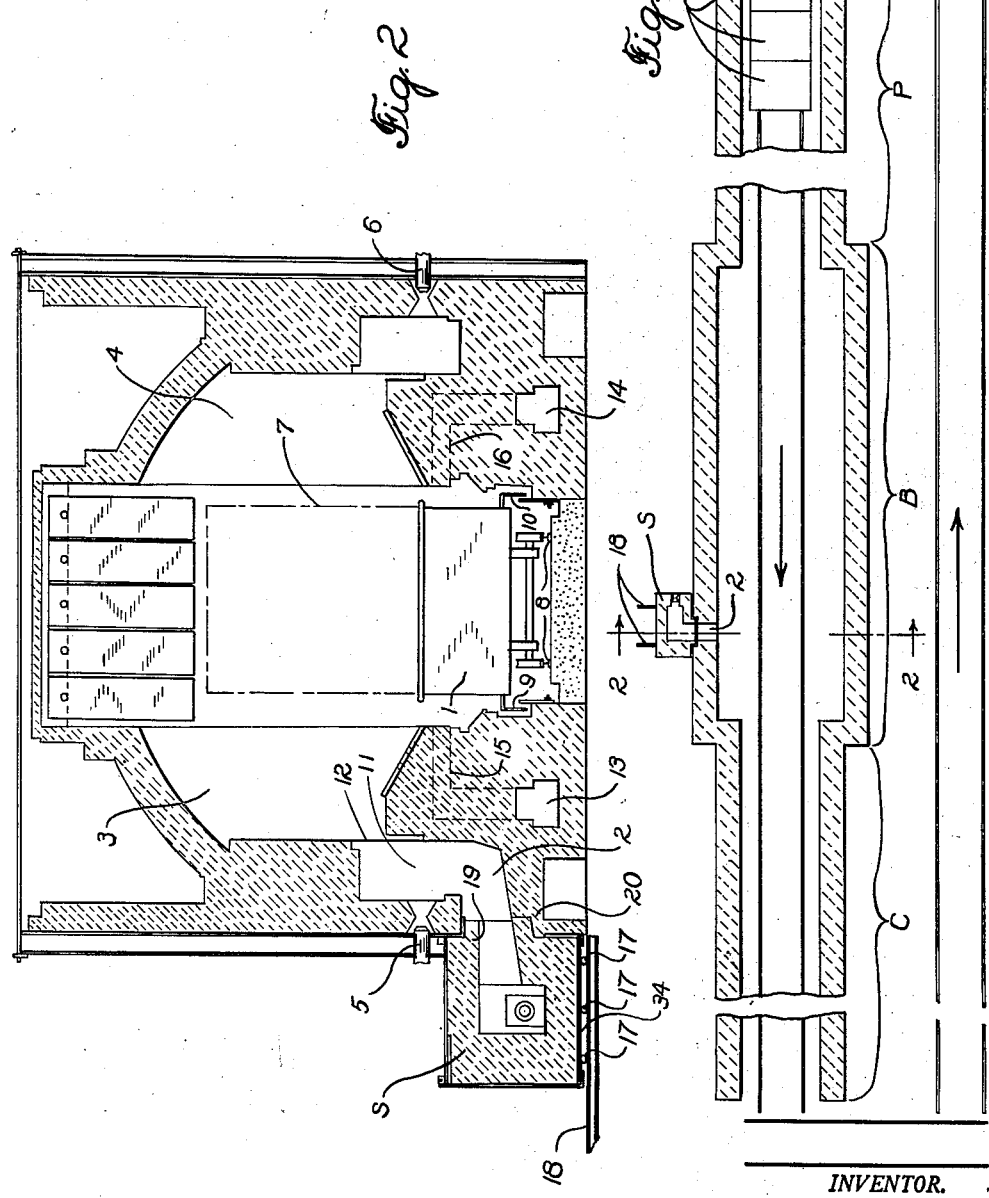
INVENTOR.
JAMES T. ROBSON
BY
Bosworth & Sessions
ATTORNEYS July 4, 1950  J. T. ROBSON  2,514,143
SALT GLAZING APPARATUS
Filed May 4, 1946  2 Sheets-Sheet 2
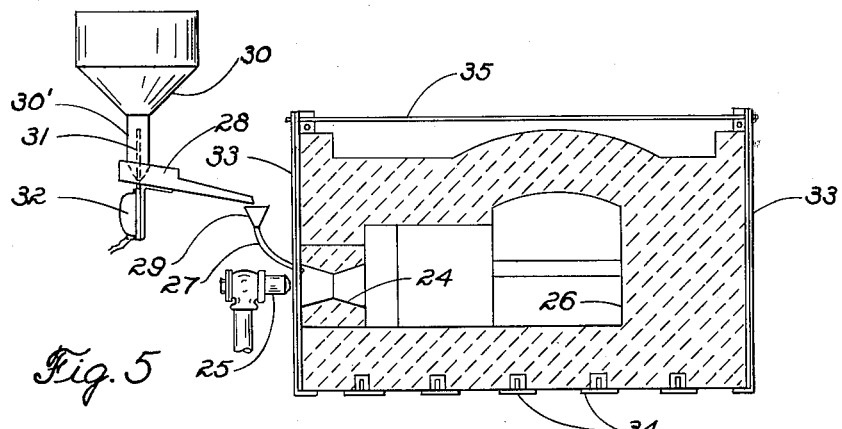
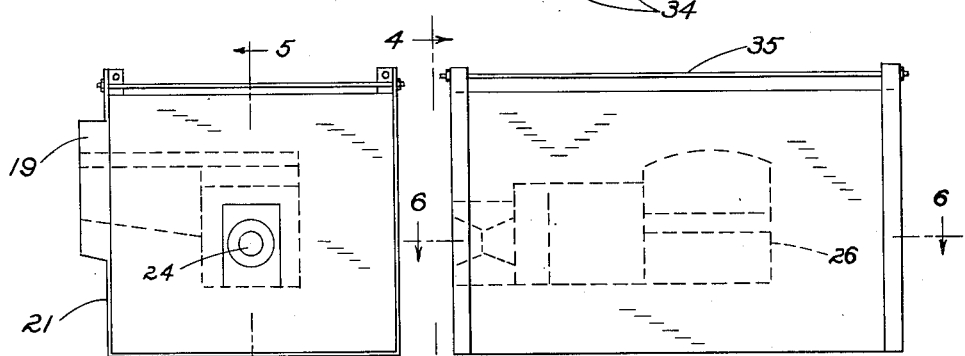
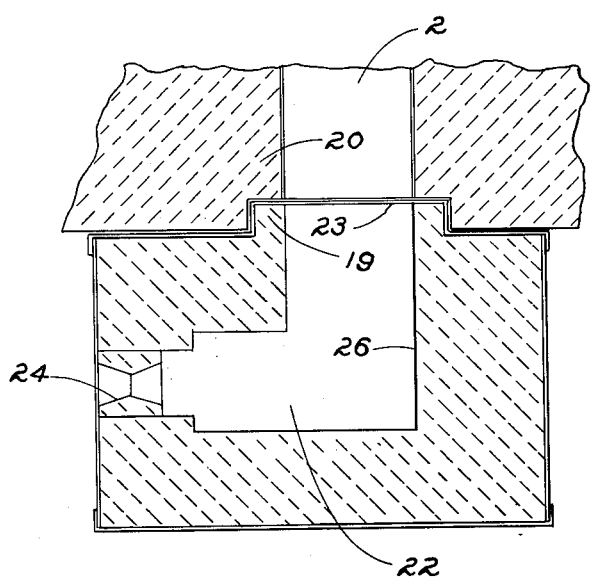
INVENTOR.
JAMES T. ROBSON
BY
Bosworth & Sessions
ATTORNEYS Patented July 4, 1950

2,514,143

UNITED STATES PATENT OFFICE 2,514,143

SALT GLAZING APPARATUS

James T. Robson, Richmond Heights, Ohio, assignor to Ferro Enamel Corporation, Cleveland, Ohio, a corporation of Ohio Application May 4, 1946, Serial No. 667,432

8 Claims. (Cl. 25—132)

This invention relates to apparatus for firing or burning ceramic articles and more particularly to improved means for applying salt vapor to ceramic ware as it is being burned in a continuous kiln.

Salt glazing has been practiced in the ceramic arts for many years. It consists generally of submitting ceramic ware, such as pottery, china ware, bricks or other articles, to an atmosphere of salt vapor during the burning process whereby the desired glaze or finish is obtained. This procedure has been carried out in straight-through continuous kilns, in which the ware is stacked on cars which move through the kiln tunnel or ware chamber in close succession, by feeding a salt or chemical (usually sodium chloride or a combination of sodium chloride and borax) into the fuel burners of the burning section of the kiln. In the prior practice the salt has been mixed with fuel oil or has been fed in dry form directly into the firebox. The heat of combustion vaporizes a certain portion of the salt and the salt fumes or vapor contact the ware to produce the desired result.

However, when salt has been fed directly into the burners or firebox of a continuous kiln, difficulty has been experienced because the salt is not completely vaporized and the unvaporized portions, which may be in either a solid or molten state, impinge upon and adhere to the refractory interior structure of the kiln. Further, a certain amount of vaporized salt may condense upon the kiln structure. The action of the hot salt upon the refractory is very destructive causing disintegration of the refractory and necessitating ultimate replacement thereof. When such replacement is required in the interior of a continuous kiln the entire kiln must be shut down and permitted to cool off enough for workmen to enter and make the necessary repairs. This shut down of the kiln and rebuilding of the destroyed parts is an expensive and wasteful matter, and it is among the objects of my present invention to provide apparatus for supplying salt vapors to a continuous direct fired kiln whereby the accumulation of salt upon the interior structure of the kiln will be reduced to a minimum with consequent elimination of the costly shut downs which are necessary to repair salt destroyed sections of the kiln structure.

Other objects of my invention include: the provision of an auxiliary salt vapor producing means for continuous kilns which may be readily removed from operating position and replaced by a new salt vaporizing generator when repairs on the original unit become necessary; the provision of a kiln structure having means for receiving and distributing salt vapor from an external source; the provision of an auxiliary salt glazing box which will deliver to a kiln substantially only salt vapor and products of combustion from the salt box burner, and will retain unvaporized salt and prevent entry of same into the kiln; the provision of an auxiliary salt glazing box which may readily be removed and repaired when the corrosive action of the salt has destroyed the refractory lining of the box; the provision of auxiliary salt vapor producing means which eliminates kiln shut downs for repairs due to salt damage; the provision of apparatus for supplying salt vapor to a kiln and restricting the effective zone of action of the vapor by withdrawing the vapor from the kiln at predetermined locations therein; and the provision of a simple, rugged, economical and effective means for generating salt vapor and delivering same to a ceramic kiln.

The above and other objects of my invention will appear from the following description of one embodiment thereof reference being had to the accompanying drawings in which:

Figure 1 is a diagrammatic horizontal cross sectional view illustrating a direct fired continuous kiln with my improved auxiliary salt glazing box in operating position.

Figure 2 is an enlarged vertical cross sectional view, taken on line 2—2 of Figure 1, and showing the general arrangement of my auxiliary salt glazing box with a typical kiln.

Figure 3 is a detached side elevation of my improved box.

Figure 4 is an end view, taken on line 4—4 of Figure 3.

Figure 5 is a vertical cross sectional view, taken on line 5—5 of Figure 4, and also illustrating means for feeding salt to the burner of the salt box.

Figure 6 is a horizontal cross sectional view, taken on line 6—6 of Figure 3, and also showing a part of the kiln wall structure.

The kiln which is diagrammatically illustrated in Figure 1 may be of any suitable type and design; that illustrated being a tunnel kiln of the usual form and including a ware chamber or passage comprising a preheating zone or section P, a burning zone or section B, and a cooling zone or section C. The ware to be burned and glazed is loaded on cars 1, several of which are indicated in the preheat section of the kiln. It will be understood that, although only a few are illustrated, these cars extend through the kiln in an unbroken series when the kiln is operating. Unburned ware is loaded on the cars ahead of the preheating zone P and the burned ware removed from the cars after they leave the cooling zone C and the empty cars then returned to the entering end of the kiln for re-loading. Suitable burners, ducts, wall chambers, vents, blowers, and etc. (not shown) are provided for maintaining the proper temperature and atmospheric conditions within the various parts of the kiln.

I have illustrated my auxiliary salt glazing box S as located adjacent the exit end of the burning zone B and positioned against the wall of the kiln with its outlet opening aligned with the outer end of salt vapor inlet duct 2 which opens at its inner end into the burning zone B and directs the salt vapor output of the box or generator S into the interior of the kiln where it will circulate around the ware on the cars I and produce the desired glazing results. As is best seen in Figure 2, the burning zone B has enlarged side chambers 3 and 4 and is provided with a group of fuel burners, two of which are seen at 5 and 6, the products of combustion of which are directed into the chambers 3 and 4 to heat the ware (which is indicated by dot and dash lines at 7) to burning temperature as it moves through the burning zone B. The series of burners 5 and 6 will be distributed along the opposite walls of the burning zone B but will not be further described as their particular arrangement forms no part of the present invention.

The car I is supported on track 8 and seals for preventing the entry of gases to the area below the cars are indicated at 9 and 10. The salt vapor inlet duct 2 connects to the vertical passage 11 which in turn opens into the chamber 3 at 12. Longitudinally extended ducts 13 and 14 are provided with connections 15 and 16 extending into the burning chamber B adjacent the bottom of the ware 7 which is loaded on the cars I. The passages 15 and 16 open into the burning chamber ahead of the salt vapor inlet duct 2 and may be used to withdraw vapor from the burning chamber and thus prevent undesired contact of the salt vapor with the ware in the preheating zone or the advance portion of the burning zone. Similar vapor withdrawing passages (not shown) may be provided between the vapor duct 2 and the exit end of the burning chamber B to further restrict the effective salt glazing zone.

The auxiliary salt box S is preferably supported on rollers 17 on tracks 18 and has a projecting lip portion 19 which fits into a corresponding recess in the outer wall 20 of the kiln. This connection is also seen in Figure 6 which illustrates how the side wall 21 of the box S closely engages the side wall 20 of the kiln while the lip 19 locates and retains the box S in proper location. When the box is placed in position, the joint around the lip 19 may be sealed with fireclay or other suitable material to prevent leakage between the box S and the kiln. Rollers 17 permit the salt box unit to be readily moved into operating position as shown in Figure 2 and, when it is desired to remove a salt box for repairs and replace it with a new unit, the rollers 17 and track 18 facilitate such removal and replacement.

The details of my auxiliary salt glazing box are shown in Figures 3 to 6 inclusive. The illustrated form of auxiliary box comprises a generally rectangular structure of fire brick or other suitable material. The refractory walls of the box define an L-shaped combustion and vaporizing chamber 22 having a vapor outlet opening 23 and a burner port 24. The burner 25 has a nozzle or outlet directed through the port 24 and thus the flame and products of combustion are projected against the wall 26 which lies in the path of discharge from the burner. Salt is fed into the generator unit adjacent the burner outlet through a pipe 27 and is picked up by the blast from the nozzle of the burner.

A major part of the salt is vaporized by the heat of combustion of the fuel supplied through the burner but a certain amount of unvaporized salt may impinge upon the wall 26 and collect on the other walls of the chamber 22. As the mixture of the products of combustion and salt vapor must make a right angle turn in the chamber 22, a separating effect is obtained tending to cause unvaporized salt to collect on the chamber walls so that the discharge from the outlet 23 to the kiln inlet duct 2 will comprise substantially only products of combustion and fully vaporized salt fume.

Thus it will be seen that my improved auxiliary salt glazing box or generator effectively eliminates the major source of salt damage to the interior of the kiln structure and greatly increases the life of the kiln. The walls of the chamber 22 of the salt box S will, of course, be subject to relatively rapid deterioration but when this reaches an undesirable degree, the salt box is merely rolled away from the kiln on the rollers 17 and replaced by another box having freshly lined walls and the worn out box may be dismantled or rebuilt without necessitating any shut down of the kiln.

In Figure 5 I have illustrated an effective means for delivering salt to the generator unit. This includes a trough 28 which discharges into a funnel 29 connected to the feed pipe 27. A hopper 30 contains the supply of salt which is fed out through an outlet pipe 30' at the bottom of the hopper. An agitating rod member 31 is carried by a vibrator unit 32 and extends up into the outlet pipe 30'. The vibrator 32 is preferably electrically actuated and serves to maintain a steady flow of salt from the hopper 30 into the trough 28 from which it moves by gravity into the burner port 24. Any other suitable means for feeding salt into the burner outlet area may be employed.

The particular shape and arrangement of refractory blocks and bricks used in building up my improved salt vapor generator is not shown in the drawings, but it will be understood that they will be of suitable size and shape to form the bottom, side walls, and roof of the generally L-shaped combustion and vaporizing chamber 22. The box structure is enclosed within a structural iron frame having vertical side members 33, bottom members 34 which are adapted to rest on the rollers 17, and tie rods 35 extending across the top of the box between the side members 33. This open metal frame structure may be taken apart if necessary when cleaning, rebuilding, or repairing the refractory walls of the chamber 22.

Although I have described the illustrated embodiment of my invention in considerable detail, it will be understood that variations and modifications may be made in the form and arrangement of parts employed. I do not, therefore, wish to be limited to the exact apparatus herein shown and described, but claim as my invention all forms thereof coming with the scope of the appended claims.

I claim:

1. In combination a kiln having a burning section, a fuel burner having an outlet positioned to supply heat directly to ware in said burning section, a salt vapor inlet duct having its inner end adjacent the outlet of said fuel burner, and a salt vapor generator unit removably supported adjacent said kiln, said generator unit including a fuel burner, independent of said first named burner, and means for discharging salt adjacent the outlet thereof, and having a salt vapor outlet connected to the outer end of said salt vapor inlet duct.

2. In combination a kiln having a burning section, a fuel burner having a discharge nozzle positioned to supply heat directly to ware in said burning section, a salt vapor inlet duct having its inner end adjacent the nozzle of said fuel burner, a salt vapor generator unit removably supported adjacent said kiln and having a vapor outlet connected to the outer end of said salt vapor inlet duct, said generator unit including a combustion and vaporizing chamber, a fuel burner directed into said chamber, and means for feeding salt into said chamber, a wall of said chamber being arranged transversely of the outlet of said last named fuel burner whereby the products of combustion and unvaporized salt will impinge against said wall.

3. In combination with a ceramic kiln structure having walls defining a ware chamber and a salt vapor inlet duct extending through one of said walls into said ware chamber, an auxiliary salt vapor generator independent of said kiln structure and having a vapor outlet adapted to discharge salt vapor into said salt vapor inlet duct, and means for removably supporting said generator with said vapor outlet positioned to discharge vapor into said salt vapor inlet duct, said generator including means for creating a salt vapor and wall means for collecting unvaporized salt and preventing same from entering said kiln ware chamber.

4. Salt glazing apparatus for ceramic articles including a kiln, means for heating ware in said kiln to burning temperature, and means independent of and removable from said kiln for generating salt vapor and discharging same into said kiln, said vapor generating means having incorporated therein wall means for collecting unvaporized salt before same is discharged into said kiln.

5. Apparatus for supplying salt vapor to a ceramic kiln or the like comprising a salt box structure including walls defining a combustion and vaporizing chamber, said chamber having a refractory lining, a burner port opening into said chamber, a discharge outlet leading from said chamber, a refractory wall interposed in the path of gases moving from said burner port to said outlet, a fuel burner having its outlet directed toward said refractory wall, and means for feeding salt into the path of discharge from said burner.

6. An auxiliary salt glazing box of the type described including walls defining a combustion and vaporizing chamber, a fuel burner having an outlet positioned to discharge into said chamber, means for feeding salt into the burner discharge at a point adjacent the burner outlet, an outlet opening adapted to permit the escape of products of combustion and salt vapor from said chamber, and wall means in said chamber in the path of gases moving from said burner to said outlet opening for deflecting substantially all of the products of combustion and salt vapor and removing unvaporized salt therefrom.

7. Apparatus for supplying salt vapor to a ceramic kiln or the like comprising a salt box structure having walls defining a generally L-shaped combustion and vaporizing chamber, a burner port opening into one end of said L-shaped chamber and a discharge outlet at the other end of said L-shaped chamber, a fuel burner having its outlet at said burner port, and means for feeding salt into the path of discharge from said burner.

8. Apparatus for supplying salt vapor to a ceramic kiln or the like comprising a salt box structure having walls defining a generally L-shaped combustion and vaporizing chamber, a burner port opening into one end of said L-shaped chamber and a discharge outlet at the other end of said L-shaped chamber, a fuel burner having its outlet at said burner port, and means for feeding salt into the path of discharge from said burner, said salt feeding means including a salt hopper having an outlet, an agitating rod member extending into said outlet, means for vibrating said agitating rod, and means for conveying salt from said hopper outlet to a point adjacent said burner outlet.

JAMES T. ROBSON.

REFERENCES CITED

The following references are of record in the file of this patent:

UNITED STATES PATENTS

| Number | Name | Date |
| --- | --- | --- |
| 316,397 | Plumb | Apr. 21, 1885 |
| 1,556,208 | Dressler | Oct. 6, 1925 |
| 1,556,260 | Steere | Oct. 6, 1925 |
| 1,632,143 | Morse | June 14, 1927 |
| 1,919,322 | Dressler | July 25, 1933 |